Aug. 8, 1933.  J. HOLLE  1,921,466
AUTOMOBILE HEATER
Filed May 28, 1932  3 Sheets-Sheet 1
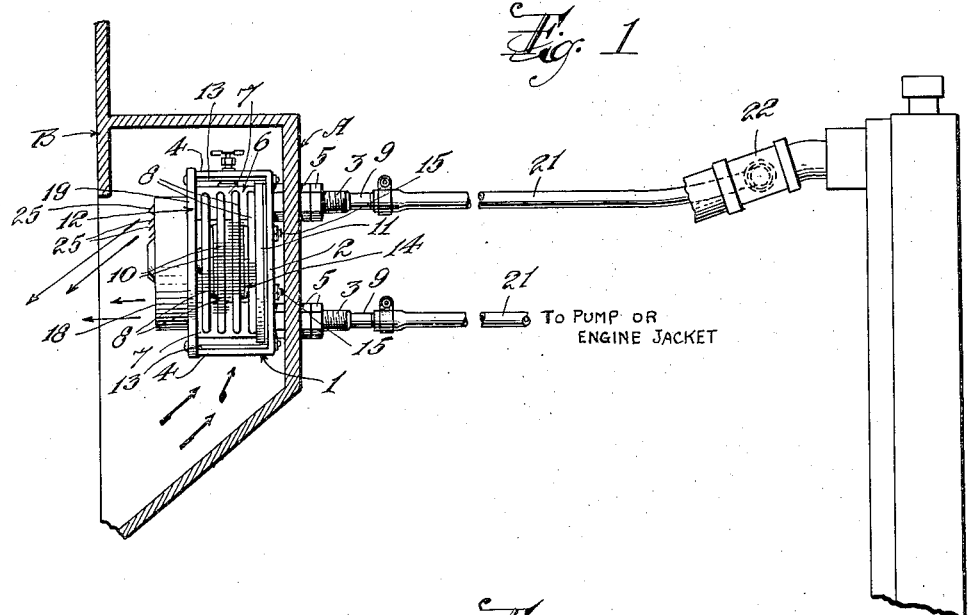
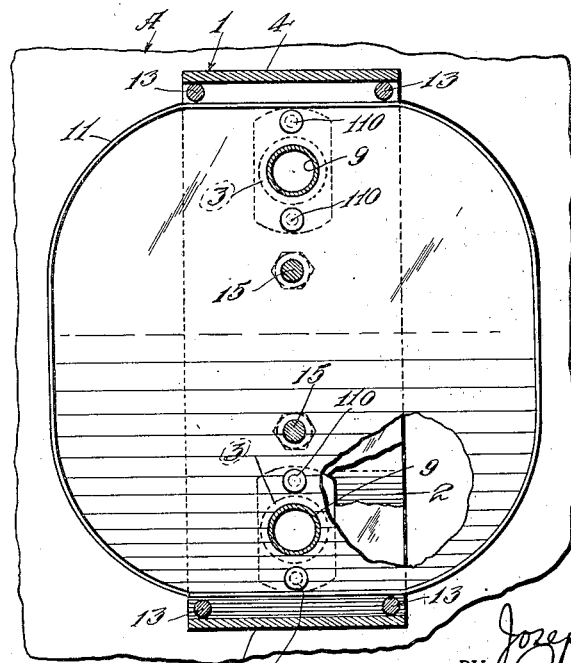
INVENTOR.
Joseph Holle,
BY
ATTORNEYS.

Aug. 8, 1933.  J. HOLLE  1,921,466
AUTOMOBILE HEATER
Filed May 28, 1932  3 Sheets-Sheet 2
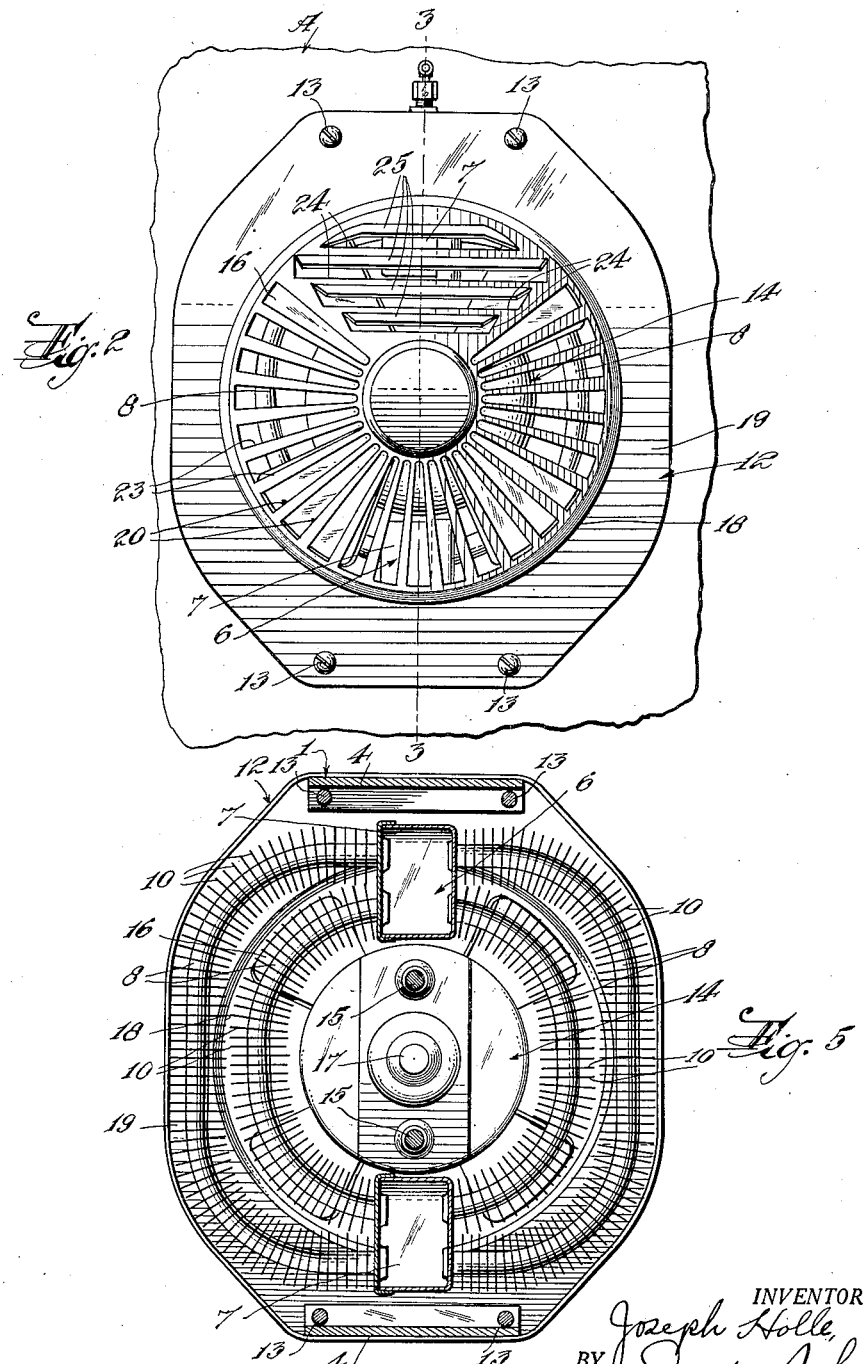
INVENTOR.
Joseph Holle,
BY Everett H. Rook,
ATTORNEYS.

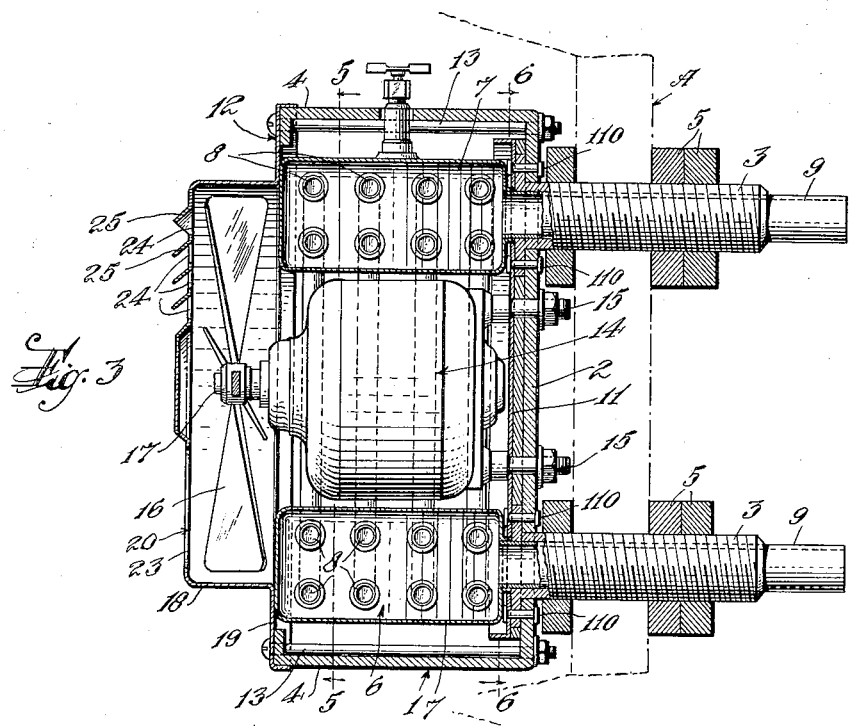
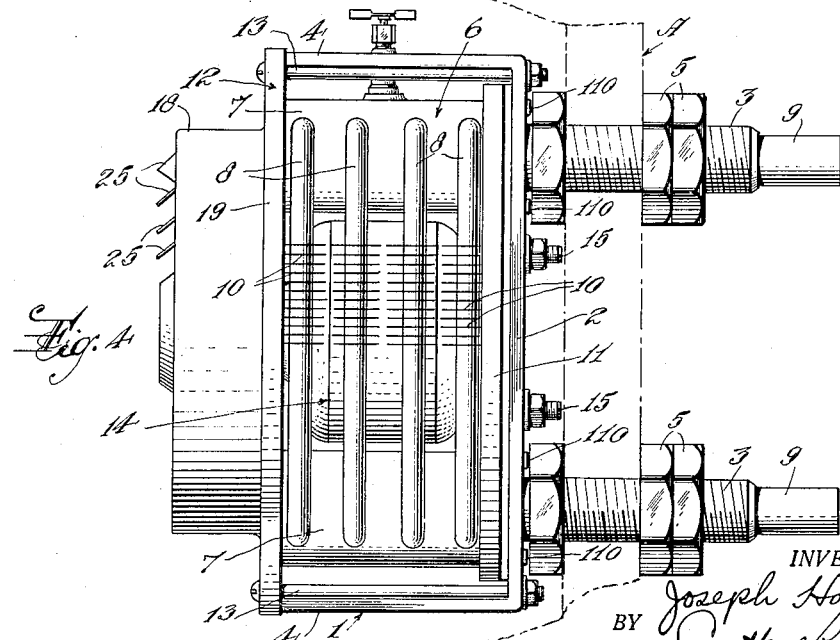

Patented Aug. 8, 1933

1,921,466

UNITED STATES PATENT OFFICE 1,921,466

AUTOMOBILE HEATER

Joseph Holle, East Orange, N. J.

Application May 28, 1932. Serial No. 614,245

8 Claims. (Cl. 257—137)

This invention relates in general to automobile heaters of the type wherein cool air within the automobile body is drawn from the lower portions of the body into heat exchanging relation to a heat radiator in which hot water is circulated from the engine cooling system, and the heated air is then caused to circulate through the automobile body. Heaters of this character are usually mounted on the dash-boards of automobiles beneath the cowls on the interiors of the automobile bodies, and include a radiator, an electric motor driven fan to cause circulation of air into contact with the heat radiating surfaces of the radiator, and means for regulating or directing the hot air currents as the air currents are forced by the fan into the automobile body.

Due to the limited space available beneath the cowls of the automobiles, some known heaters of this character interfere with freedom of movement of the legs of the driver or passenger in the front seat of the automobile. Furthermore, the regulators or deflectors for the hot air currents in many heaters of this type are defective either in inefficiently obstructing the flow of the air, or in failing to prevent the flow of hot blasts into the faces of the occupants of the front seat of the automobile, or such regulators or deflectors are difficult to operate or rattle from vibration of the automobile so as to cause objectionable noise. Many such heaters also require complete removal thereof from the automobile for repair of the radiator or the fan motor, and this is difficult and consumes a large amount of time. Known heaters of the character described are also complicated and unreliable in structure, both in the radiator and the mounting of the device on an automobile.

Among the objects of my invention are to provide an automobile heater of the general character described embodying novel and improved features of construction, combination and arrangement of the parts whereby the heater shall be small and compact, occupy a small amount of space and yet shall be highly efficient in heating a large volume of air in a short period of time; to provide such a heater having novel and improved means comprising a single piece of material for regulating or deflecting the hot air currents so that such currents shall be directed and distributed most efficiently and the deflector shall be free from rattling under vibration of the automobile; to provide in such a heater novel and improved means for mounting the parts on an automobile, whereby the motor and/or radiator can be detached without complete disassembling or removal of the heater from the automobile; and to provide a heater of this character which shall be simple, reliable and relatively inexpensive in construction and operation.

Another object is to provide an automobile heater of the character described including a novel and improved mounting bracket for securing the heater on an automobile, and novel and improved means for mounting the radiator and the electric fan motor on said bracket to facilitate mounting of the heater on an automobile and removal of the radiator and/or motor for repair or other purposes, and to permit free circulation of air over the heat radiating surfaces of the radiator.

A further object is to provide a novel and improved face plate or cover for such a heater, formed of one piece of material and having air outlet openings and deflectors arranged to direct the air currents downwardly and rearwardly into the automobile body.

Other objects are to provide a novel and improved radiator for insuring a free circulation of water therethrough and a maximum of heat exchange between the radiator and the air currents; and to obtain other advantages and results as will be brought out by the following description.

Referring to the accompanying drawings in which corresponding like parts are designated throughout the several views by the same reference characters, Figure 1 is a side elevation of an automobile heater embodying my invention and showing the heater applied to an automobile which is fragmentarily illustrated.

Figure 2 is a front elevation of the heater shown on a larger scale.

Figure 3 is a vertical longitudinal sectional view through the heater on line 3—3 of Figure 2.

Figure 4 is a side elevation of the heater.

Figure 5 is a transverse vertical sectional view on the line 5—5 of Figure 3, and Figure 6 is a transverse vertical sectional view on the line 6—6 of Figure 3.

Specifically describing the illustrated embodiment of the invention, the heater includes a U-shaped bracket 1 which has secured in the base portion 2 thereof by rivets 110, a pair of flanged threaded bushings 3 which project outwardly from the base portion at substantially right angle thereto and in a direction opposite to that in which project the arms 4 of the bracket. The bushings 3 are for the purpose of mounting the bracket on an automobile body, and in mounting the bracket, preferably the dash board A of an automobile is provided with openings to receive the bushings and the bracket is clamped on the dash board by nuts 5 threaded on the bushings. Generally the bracket will be arranged beneath the cowl B of the automobile body, as clearly shown in Figure 1 of the drawings.

A radiator 6 is mounted on the bracket 2 between the arms 4 thereof. Preferably this radiator includes two spaced tanks 7 which are connected by curved tubes 8 so that the radiator is approximately annular in configuration, as shown in Figure 5. Each of the tanks 7 has connected thereto a nipple 9, and in mounting the radiator on the bracket, one of these nipples 9 is passed through each of the bushings 3 so that the ends of the nipples project beyond the outer ends of the bushings, as shown in Figures 1 and 3. The tubes 8 are shown in two series, and each tube has mounted thereon a plurality of heat radiating fins 10. The tubes are spaced so as to provide passages between them throughout their length to permit flow of air radially toward the center of the radiator and then outwardly from one end thereof.

Preferably an end plate 11 is interposed between one end of the radiator and the base portion of the bracket, and a face plate 12 is secured to the ends of the arms 4 of the bracket by bolts 13. This face plate abuts the front end of the radiator opposite the base portion of the bracket, so as to clamp the radiator between the base portion of the bracket and the face plate.

An electric motor 14 is mounted on the base portion of the bracket within the radiator by bolts 15, so that the radiator surrounds the motor, and a fan 16 is mounted on the motor shaft 17 between the front end of the radiator and the face plate 12. The central portion of the face plate extends forwardly as indicated at 18 from the rim portion 19 of the plate so as to provide a chamber for the fan 16 and to form an outlet for the air from the radiator. This extension 18 of the face plate is provided with a plurality of air outlet apertures 20.

In use of the heater as so far described, the heater is mounted on the dash board of an automobile by slipping the bushings 3 through previously formed openings in the dash board and clamping the bracket in position by the nuts 5. The nipples 9 are then connected by suitable conduits, hoses or pipes 21 to the water circulating system of the automobile engine. For example, one of the pipes 21 may be connected to the top of a radiator as indicated at 22, while the other pipe may be connected to the water pump or to some portion of the water jacket of the engine. The hot water from the water cooling system of the engine will then circulate through the radiator tanks 7 and tubes 8. Upon starting of the motor 14, the fan 16 will draw air from the lower portions of the automobile body radially inwardly of the radiator toward the center thereof, as indicated by the heavy arrows on Figure 1. The air will thus become heated by exchange of heat from the surfaces of the radiator to the air, and the heated air will be forced from the front end of the radiator through the air outlet apertures 20 in the face plate. Free circulation of the air about heat radiating surfaces of the radiator is thereby ensured and the air will contact with a large area of the heat radiating surface so that a large quantity of air will be heated in a short period of time.

It is a feature of the invention to provide means for regulating or controlling the flow of air through the apertures of the face plate 12 into the automobile body. It is desirable to provide a minimum of obstruction to the flow of the air, but at the same time prevent hot concentrated blasts of air being thrown against the occupants of the front seat of the automobile. To accomplish these results, I have shown the air outlet apertures at the lower portion of the face plate in the form of elongated slots 23 arranged radially with respect to the center of the face plate, while at the upper portion of the face plate I have shown a plurality of parallel slots 24 which are disposed transversely or chordally of the face plate. The upper longitudinal sides of the openings 24 are provided with louver flanges 25, which are integral with the face plate and project obliquely downwardly and forwardly therefrom. With this construction, the currents of air are forced forwardly and approximately horizontally through the lower outlet apertures 23, while the currents from the upper apertures 24 are deflected downwardly by the louver flanges 25 and obliquely across the currents issuing from the apertures 23. The currents from the upper apertures 24 are thereby prevented from flowing into the faces of the occupants of the front seat of the automobile, and at the same time these currents merge with the currents from the lower apertures 23 so as to spread the latter currents and force them downwardly. A wide and uniform distribution of the hot air issuing from the heater is thereby produced. With this construction, there is no need for adjustable shutters or vanes to control the flow of the air currents, and there are no pivoted or loosely connected parts to rattle under vibration of the automobile.

The heater embodying my invention, due to the novel features of construction, may be small and compact and yet efficiently heat a large quantity of air in a short period of time. The drawing of the cool air radially inwardly from the periphery of the heater and forcing the heated air from the front end thereof, ensures a large area of contact between the air and the radiating surfaces of the radiator. The heater may be firmly and rigidly supported on the automobile and can be easily and quickly applied to and removed from the automobile. Another important advantage of the construction is that the radiator and the motor, or either of them, can be removed from the heater without completely disassembling the heater, and without removal of the mounting bracket 1 from the automobile. The required and desirable uniform and wide distribution of the hot air currents from the heater is effectually obtained by the face plate and without any adjustment of any parts.

While I have shown and described the invention as embodied in certain details and construction, it should be understood that this is primarily for the purpose of illustrating the principles of the invention, and that many modifications and changes can be made in the details and construction without departing from the spirit or scope of the invention.

Having thus described my invention, what I claim is:

1. An automobile heater comprising a U- shaped bracket having a pair of bushings projecting outwardly from the base thereof to enter openings in a support, an electric motor separably mounted on said base portion of said bracket and having a fan connected to the shaft of the motor, and an annular radiator for circulating liquid disposed between the arms of said bracket surrounding said motor and having inlet and outlet nipples removably passing through said bushings.

2. An automobile heater comprising a U-shaped bracket having a pair of bushings projecting outwardly from the base thereof to enter openings in a support, an electric motor separably mounted on said base portion of said bracket and having a fan connected to the shaft of the motor, an annular radiator for circulating liquid disposed between the arms of said bracket surrounding said motor and having inlet and outlet nipples removably passing through said bushings, and an apertured face plate separably secured upon the arms of said bracket and abutting the end of said radiator to clamp the radiator between said face plate and said base portion of the bracket.

3. An automobile heater comprising a U-shaped bracket having a pair of bushings projecting outwardly from the base thereof to enter openings in a support, and an annular radiator for circulating liquid disposed between the arms of said bracket and having inlet and outlet nipples removably passing through said bushings, and an apertured face plate separably secured upon the arms of said bracket and abutting the end of said radiator to clamp the radiator between said face plate and said base portion of the bracket.

4. The automobile heater set forth in claim 1 wherein said radiator has air passages to permit air to flow radially inwardly to the center of the radiator and then outwardly from one end of the radiator under influence of said fan.

5. The automobile heater set forth in claim 2 wherein said fan is mounted at the front of said radiator behind said face plate, and said radiator has passages to permit flow of air radially inwardly to the center of the radiator and then outwardly through the apertures in said face plate under influence of said fan.

6. An automobile heater comprising a bracket and means for mounting said bracket on a support, an annular radiator for circulating liquid mounted on said bracket with its axis horizontal and having passages to permit flow of air radially inwardly toward the center of the radiator, a motor driven fan at the front end of said radiator for drawing air through said passages and forcing air outwardly from the front end of the radiator, and a face plate on said bracket over the front end of said radiator and said fan, said face plate having a plurality of forwardly directed air outlet apertures, and means adjacent the apertures on the upper portion of the face plate for directing air currents downwardly obliquely across the currents issuing from said apertures in the lower portions of the face plate.

7. In an automobile heater, the combination with an air heating radiator having an air outlet and means for forcing heated air through said outlet, of a face plate over said outlet having a plurality of air outlet slots extending radially from the center of the plate, a plurality of substantially parallel slots disposed transversely of the plate at one side of the center thereof, and a louver flange at one longitudinal edge of each of the second-mentioned slots projecting obliquely from the plate to direct air currents from said second-mentioned slots obliquely across the currents issuing from said radial slots.

8. In an automobile heater the combination with an air heating radiator having a horizontal air outlet and means for forcing air through said outlet, of a face plate over said outlet having a plurality of forwardly directed air outlet slots at the lower portion thereof, a plurality of substantially parallel slots disposed transversely of the plate at the upper portion thereof, and a louvered flange at one longitudinal edge of each of the second-mentioned slots to direct air currents from said second-mentioned slots downwardly across the currents issuing from the first-mentioned slots.

JOSEPH HOLLE.